United States Patent [19]

Araki et al.

[11] Patent Number: 5,754,314
[45] Date of Patent: May 19, 1998

[54] IMAGE INPUT SYSTEM AND METHOD FOR READING IMAGES FROM AN ORIGINAL DOCUMENT

[75] Inventors: Yoshitaka Araki; Toshiya Aikawa, both of Kanagawa-ken, Japan

[73] Assignee: Nikon Corporation, Tokyo, Japan

[21] Appl. No.: 441,877

[22] Filed: May 16, 1995

[30]  Foreign Application Priority Data

| Jul. 13, 1994 | [JP] | Japan | 6-183961 |
| Jul. 20, 1994 | [JP] | Japan | 6-189842 |
| Jul. 25, 1994 | [JP] | Japan | 6-192879 |
| Aug. 24, 1994 | [JP] | Japan | 6-222623 |

[51] Int. Cl.[6] .................. H04N 1/04; H04N 1/46; H04N 5/253; G03B 27/62
[52] U.S. Cl. .............. 358/487; 358/506; 358/498; 358/496; 358/474; 355/75; 348/96; 348/97
[58] Field of Search .............. 358/487, 506, 358/498, 496, 474, 475; 348/96, 97, 105; 355/75

[56]  References Cited

U.S. PATENT DOCUMENTS

| 4,322,754 | 3/1982 | Mason | 358/296 |
| 4,651,198 | 3/1987 | Knirsch | 358/498 |
| 5,099,321 | 3/1992 | Igarashi | 358/487 |
| 5,521,662 | 5/1996 | Suzuki | 354/76 |

*Primary Examiner*—Edward L. Coles, Sr.
*Assistant Examiner*—Tia M. Harris
*Attorney, Agent, or Firm*—Oliff & Berridge, P.L.C.

[57]  ABSTRACT

An image input system having an image input device and an original holder that can read images from different configurations of original documents. An image input device includes a light emitting assembly that irradiates light onto an original document, a reading assembly that reads and composes the reading light passing the original document into an image and an assembly for moving the reading assembly and the original document relative to each other to scan the reading light over the original document. The original holder includes a cartridge housing component for housing a film cartridge. The original holder can be removed from the image input device, making possible the reading of images from different kinds of original documents.

53 Claims, 10 Drawing Sheets

IMAGE INPUT SYSTEM AND METHOD FOR READING IMAGES FROM AN ORIGINAL DOCUMENT

BACKGROUND OF THE INVENTION

1. Field of the Invention

The present invention relates to an image input system having an image input device that converts an image from an original document, such as, for example, a permeable, irradiated photographic film to an image signal via a fixed photo element, and an original holder that holds the original document and is used in conjunction with the image input device.

2. Description of Related Art

Japanese Laid-Open Patent Application No. 5-75922 discloses an image input device 701. A film cartridge 50 is loaded directly into the main body of the device 701 through a cartridge loading port 716, as shown in FIG. 9. Film is fed from the film cartridge 50 and is wound on the winding spool 712 after passing through aperture frames 711. The image input device 701 also includes an optical mark recording assembly 713, an optical sensor 714 and a magnetic head 715.

This device, however, has limited applications. The film cartridge 50 is loaded directly into the main body of the device. The film feeding required for loading and input image selection of the film is presupposed. There is no allowance for images to be input from slide film that has been mounted on slide mounts, six-frame cut film strips, single-frame photographic film, dental X-ray film, and the like. It is impossible to read images from these film originals using existing assemblies. In addition, when images are transmitted from film, a reading method has not been conceived wherein the film is moved, composed into an image on a line-shaped imaging assembly, and scanned. An area sensing assembly, such as a two-dimensional imaging element or the like, is required to input an image from the wide range of the photographic field of the film. The irradiation of the original requires an irradiating device that can simultaneously provide a virtually uniform brightness over the entire area of the reading range of the film. To obtain high resolution and highly detailed image information, a two-dimensional imaging assembly is required. This is more expensive than a line sensor. Also, this type of irradiating assembly results in increased size and is not suitable on small, low-cost devices.

Japanese Laid-Open Patent Application No. 5-244349 discloses a compact device for inputting images for slide film mounted on film mounts. The compact device includes a stepping motor 101 and a conveyor carriage 201, as shown in FIG. 11. A slide film mount 200, as shown, for example, in FIG. 12, is set on the conveyor carriage 201. The carriage 201 is driven by a stepping motor 101 such that the carriage is moved so that an image can be read by a line sensor. Additionally, an adaptor 401, for example, shown in FIG. 13, may be used so that film that has been cut into six-frame film strips can be fed into and read by the image input device.

In devices of this type wherein the film is moved on a conveyor carriage and an image is read, when images are input from the above-mentioned cartridge film, the film that has been pulled out from the cartridge must be held in an adaptor, or cut into film strips and used in conjunction with an adaptor. Not only do these actions become complicated, but they also counteract the advantage that the cartridge has in not allowing the operator to touch the film directly.

SUMMARY OF THE INVENTION

It is an object of the present invention to provide an image input system that can be used for image reading from different kinds of original documents, such as developed roll film, slide film mounted on film mounts, six-frame film strips, and single frame photographic film.

It is an object of the present invention to provide a device wherein the film loading operation can be easily accomplished and with which highly detailed image information can be easily read, and an original holder to be used in conjunction with the image input device, both of which are inexpensive and small in structure.

The image input system of the present invention includes an image input device having a light emitting assembly that irradiates light onto the original document, a reading assembly reads and composes the reading light passing the original document into an image. An assembly moves the reading assembly and the original document relative to each other and scans the reading light over the original document. An original holder includes a cartridge housing component for housing a film cartridge, inside which the original document has been wound around a spindle. A coupling shaft connects the spindle to a rotation transmitting assembly that transmits rotary driving force to the cartridge spindle. The original holder can be removed from the image input device.

In addition, a device can be provided with a structure such that the film loading operation can be easily accomplished, and highly detailed image information can be easily read. Moreover, this device and the original holder used in conjunction with the device can be provided with a structure that is small and inexpensive.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

An embodiment of the image input system of the present invention is described below with reference to the drawings.

Figure 1:
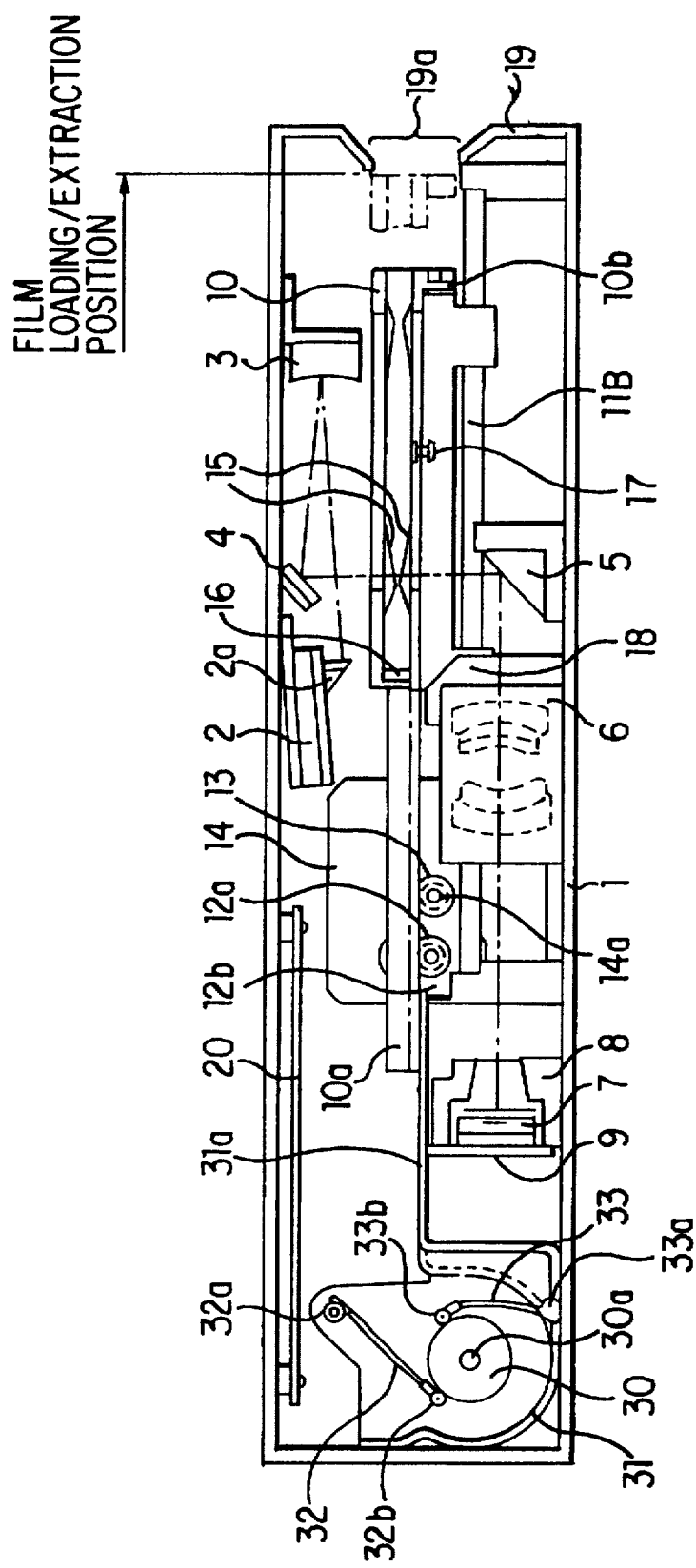
FIG. 1 is a cross sectional view of an image input system according to an embodiment of the present invention.

The image input system according to an embodiment of the present invention is shown in FIG. 1. The image input system includes a main body 1. An LED unit 2 is attached to a surface of the main body 1. The LED unit 2 is used to irradiate an original document, such as, for example, photographic film. A prism 2a positioned on a rear surface of the LED unit 2 reflects red, green and blue light rays from the LED unit 2. The prism 2a conducts the light rays to a toric mirror 3. A top mirror 4 reflects the light reflected from the toric mirror 3 to a carriage 10 in an approximately vertical orientation. The light rays are conducted to a bottom prism 5. After the irradiating light from the LED unit 2 is reflected by the bottom prism 5, the light is conducted to a line sensor 7 via a lens unit 6. A sensor cover 8 is positioned on a front surface of the line sensor 7 to prevent the irradiation of light rays other than those necessary for image reading and to prevent dust from settling onto a rear surface of the line sensor 7. A circuit board 9 supports the line sensor 7 within the main body 1.

Figure 2:
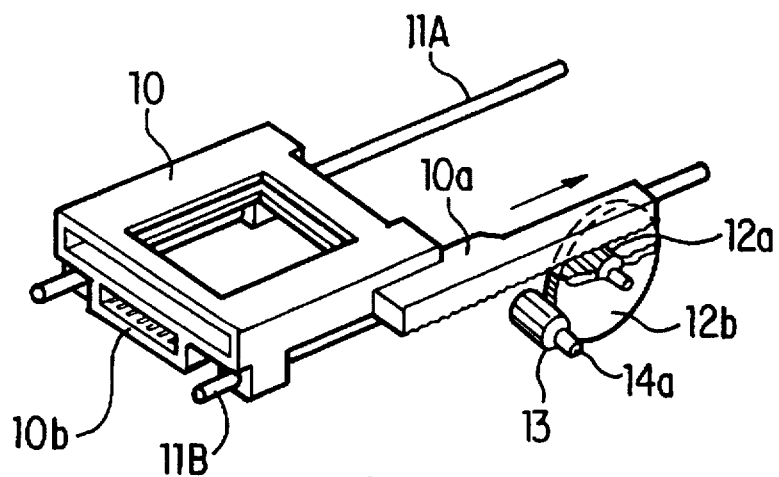
FIG. 2 is a schematic view of the carriage assembly of the image input system of FIG. 1.

The carriage assembly 10 slides along a pair of guide shafts 11A and 11B in the direction shown by the arrow in FIG. 2. The guide shafts 11A and 11B are parallel to each other and are supported by the main body 1. The rack component 10a of the carriage 10 meshes with a pinion gear 12a. Gear 12b is integral with pinion gear 12a and may be formed as a single piece. The rotation of a gear 13 attached to a rotation shaft 14a of a stepping motor 14 is transmitted to the rack component 10a through the pinion gear 12a and the gear 12b. The rotary force of the stepping motor 14 is thus converted and transmitted to a linear force in the direction shown by the arrow in FIG. 2.

An aperture 19a located in a front panel 19 of the main body 1 permits both insertion and extraction of original documents to and from the main body 1. Carriage assembly 10 includes a connector 10b for connecting the carriage assembly to an original holder 40 (described hereafter). The connector 10b has a magnetic connecting element. Compression springs 15 are positioned opposite each other on top and bottom inside surfaces of the carriage assembly 10. The compression springs 15 press and hold a film mount or original holder 40 within the carriage assembly 10. An ejecting component 16 moves the film mounts or original holder 40 to a position for easy removal by an operator.

Figure 3A:
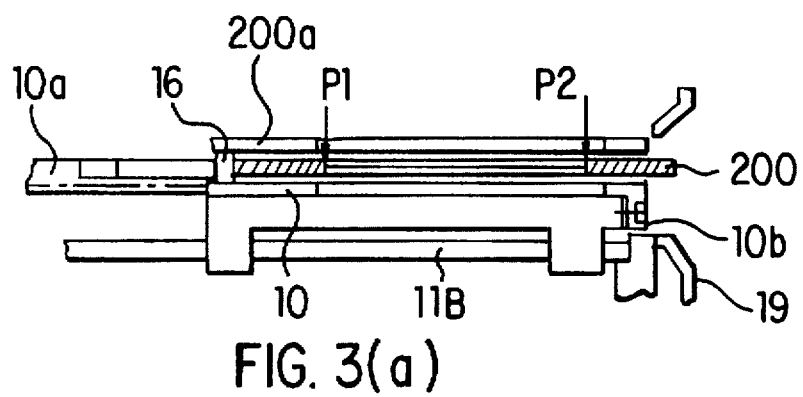
FIG. 3(a) is a cross sectional view depicting a slide film mount in a loading position in the image input system of FIG. 1.
Figure 3B:
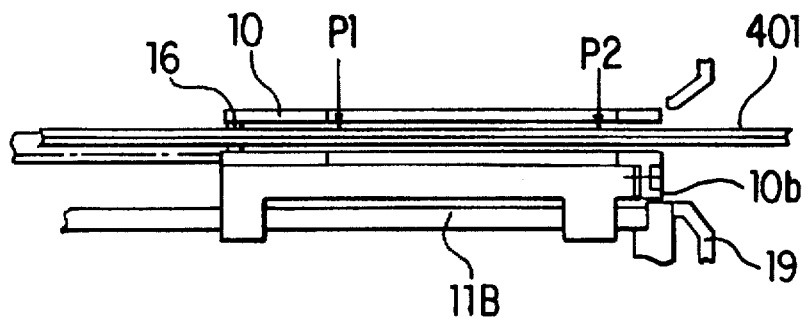
FIG. 3(b) is a cross sectional view depicting a strip film holder in a loading position in the image input system of FIG. 1.
Figure 12:
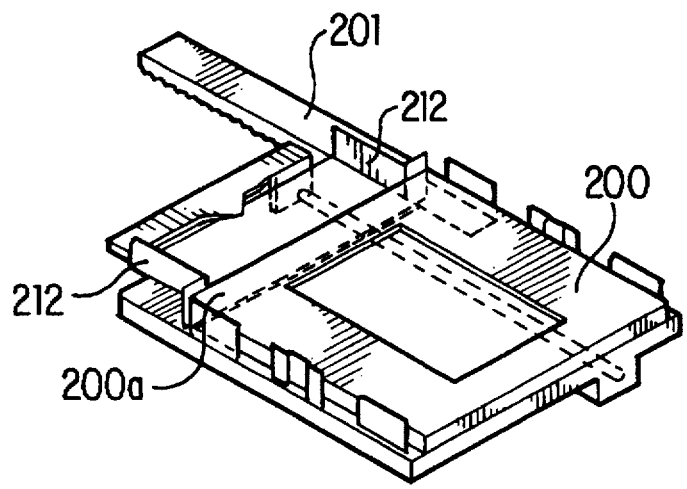
FIG. 12 is a schematic view of a slide film mount.
Figure 13:
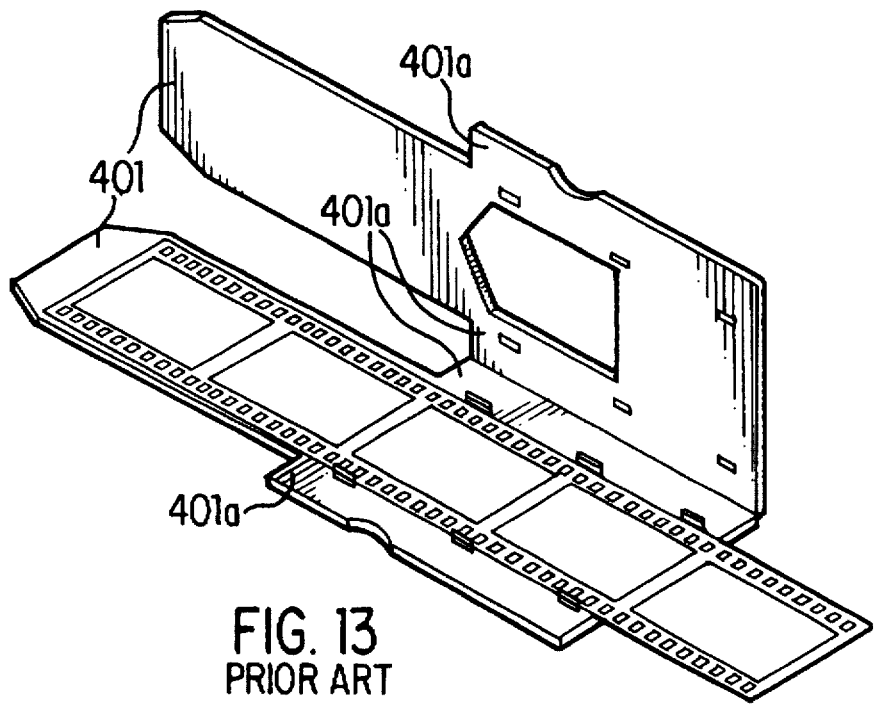
FIG. 13 is a schematic view of a strip film holder.

The slide film mount 200, shown in FIG. 12, and the strip film holder 401, shown on FIG. 13, may be loaded into the main body 1 on the carriage assembly 10, as shown in FIGS. 3(a) and 3(b). FIG. 3(a) depicts the slide film mount 200 in a loading condition in the image input device according to the present invention. FIG. 3(b) depicts the strip film holder 401 in a loading condition in the image input device according to the present invention.

When an image reading action for an original document is complete, the carriage assembly 10 is moved to a position closest to the front panel 19, shown by a line in FIG. 1, by the stepping motor 14 and the gears 12 and 13. The carriage assembly 10 is also in this position when an original document is to be loaded into the image input device. When the slide film mount 200 and the strip film holder 401 are inserted through the aperture 19a into the interior of the image input device, the leading edge 200a of the slide film mount 200 and the contact area 401a of the strip film holder 401 contact the ejecting component 16 and move the ejecting component 16 to an image reading position. The slide film mount 200 and the strip film holder 401 are held in a central position by the top and bottom compression springs 15. The compression springs 15 permit centering of the original document regardless of the thickness of the slide film mount 200 and the strip film holder 401. This holding position is maintained so that focusing errors caused by the configuration of the original document or the like will be minimized when information is read from the original document during image reading.

Figure 4:
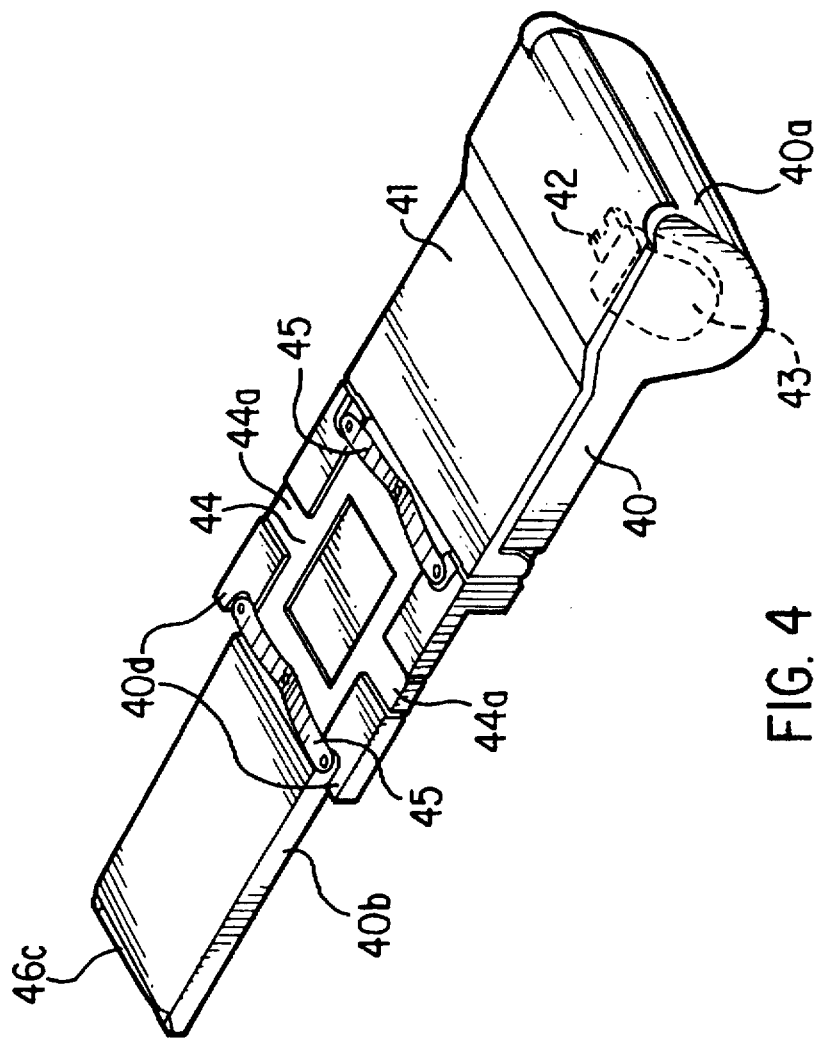
FIG. 4 is a schematic view depicting a cartridge holder for the image input system of FIG. 1.
Figure 5:
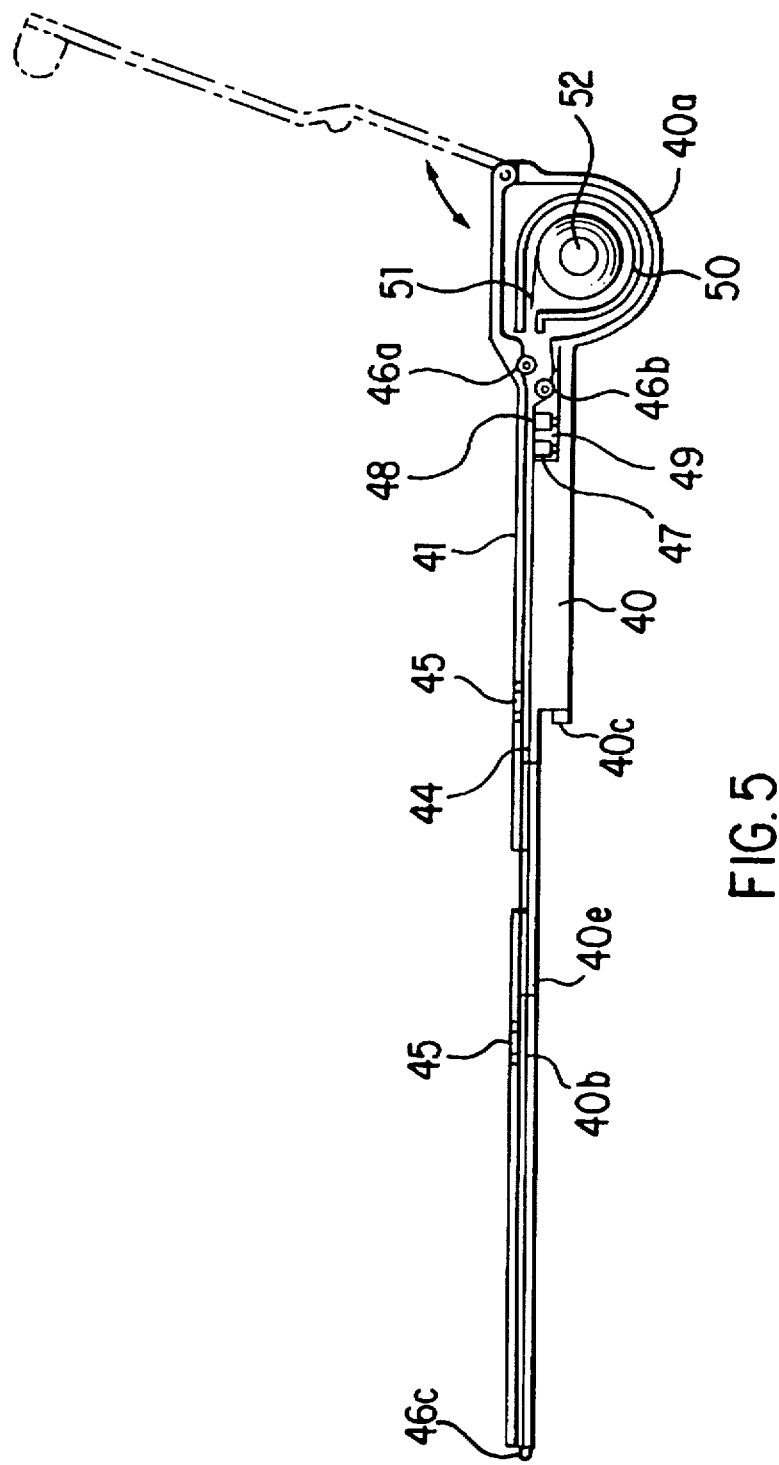
FIG. 5 is a cross sectional view of the cartridge holder of FIG. 4.

The image input system according to an embodiment of the present invention may be used with an original holder 40, as shown in FIG. 4. The original holder 40 permits the image input system to be used with roll-type film. The external appearance of the original holder 40 is shown in FIGS. 4 and 5. The original holder 40 has a cartridge housing component 40a and a film holding component 40b. A film cartridge 50 is housed inside the housing component 40a. The film holding component 40b is flat and holds the original document for image reading. This component 40b is inserted into the carriage assembly 10 in a similar manner as the strip film holder 401, discussed above.

The film holding component 40b has a thickness so that it can be held in the carriage assembly 10 by the top and bottom compression springs 15. The extraction and insertion of the film cartridge to and from the cartridge housing component 40a is accomplished by opening and closing the housing component cover 41. The housing component cover 41 is rotatably supported on the original holder 40. The cover 41 is rotatable in the directions shown by the arrow in FIG. 5.

A spool rotation coupler shaft 42 is arranged on the cartridge housing component 40a so as to be able to rotate, as shown in FIG. 4. The spool rotation coupler shaft 42 connects with the spool 52 of the film cartridge 50. A rotary force of a rotary spool driving mechanism 43 is transmitted to the film cartridge 50 through coupler shaft 42. This rotary force feeds the original document 51 forward from the film cartridge 51 or rewinds the original document into the film cartridge 51.

Figure 6:
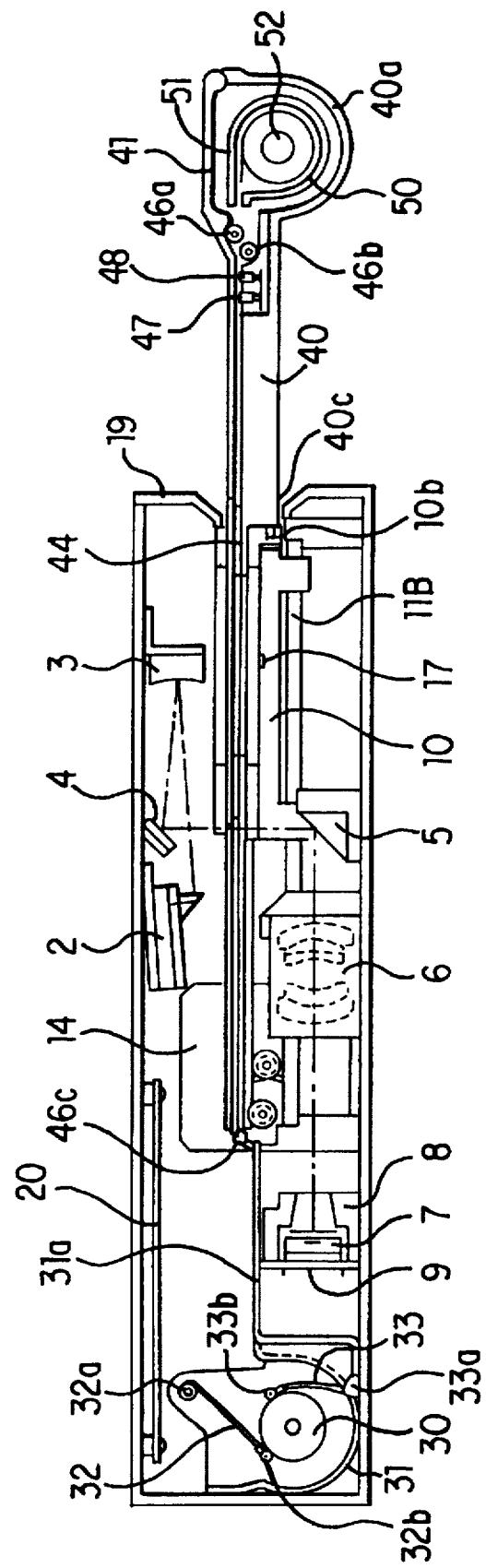
FIG. 6 is a cross sectional view depicting the cartridge holder of FIG. 4 connected to the image input system of FIG. 1.

The original holder 40 is attached to the main body 1 by inserting the original holder 40 into the carriage assembly 10 through the aperture 19a. The film holding component 40b is pushed into the main body 1 until a contact component 40d contacts the eject component 16 and moves the eject component 16 to an image reading position. FIG. 6 depicts the original holder 40 set in the main body 1. In this position, a connector 40c of the original holder 40 connects with the connector 10b of the carriage assembly 10. Multiple line electrical connection terminals are provided on both connectors 10b and 40c. The electrical supply and controlling signals from the main body 1 are transmitted through these terminals to the original holder 40. Also, the operating signals are transmitted from the original holder 40 to the main body 1.

Figure 10:
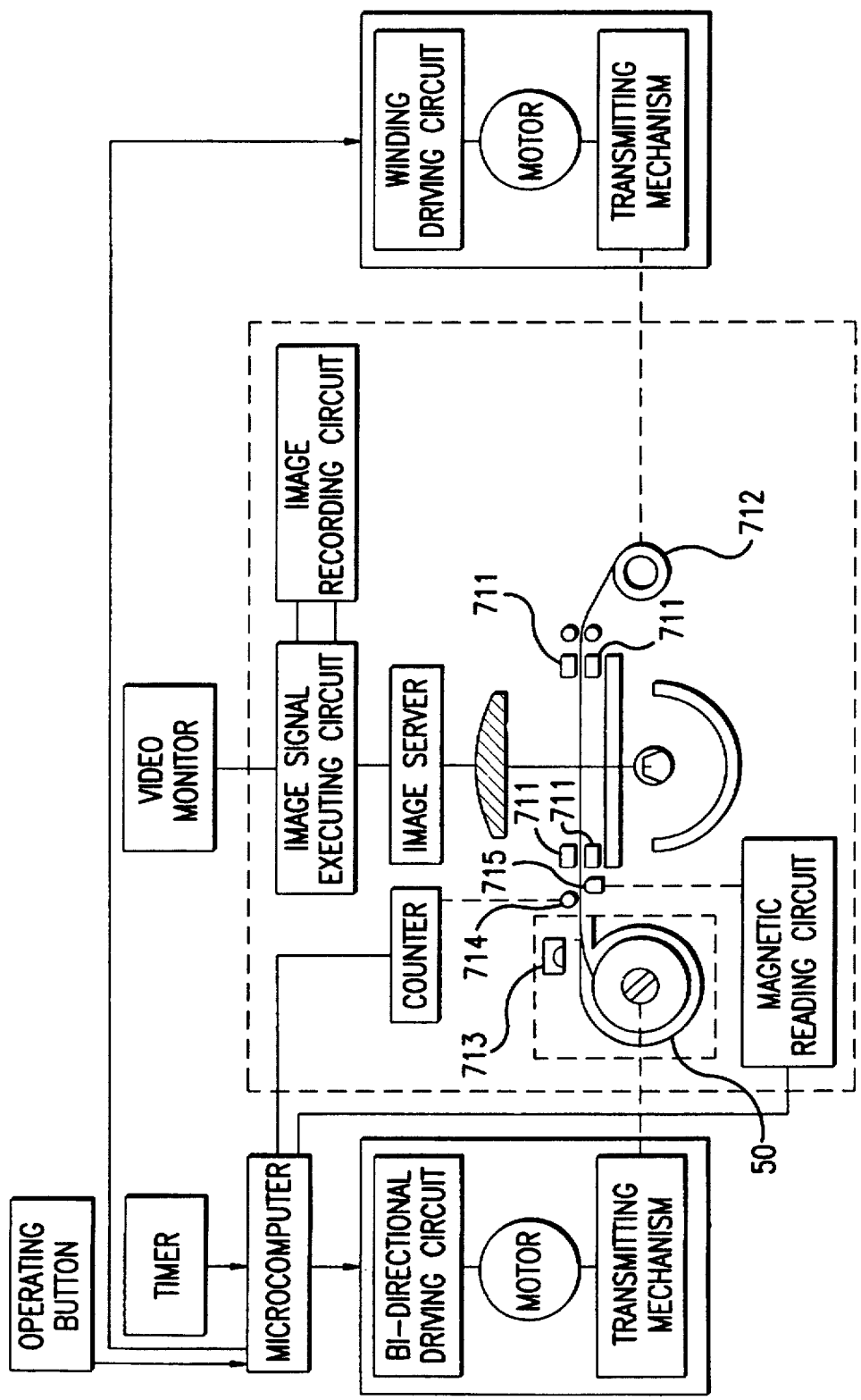
FIG. 10 is a block diagram of FIG. 9.
Figure 11:
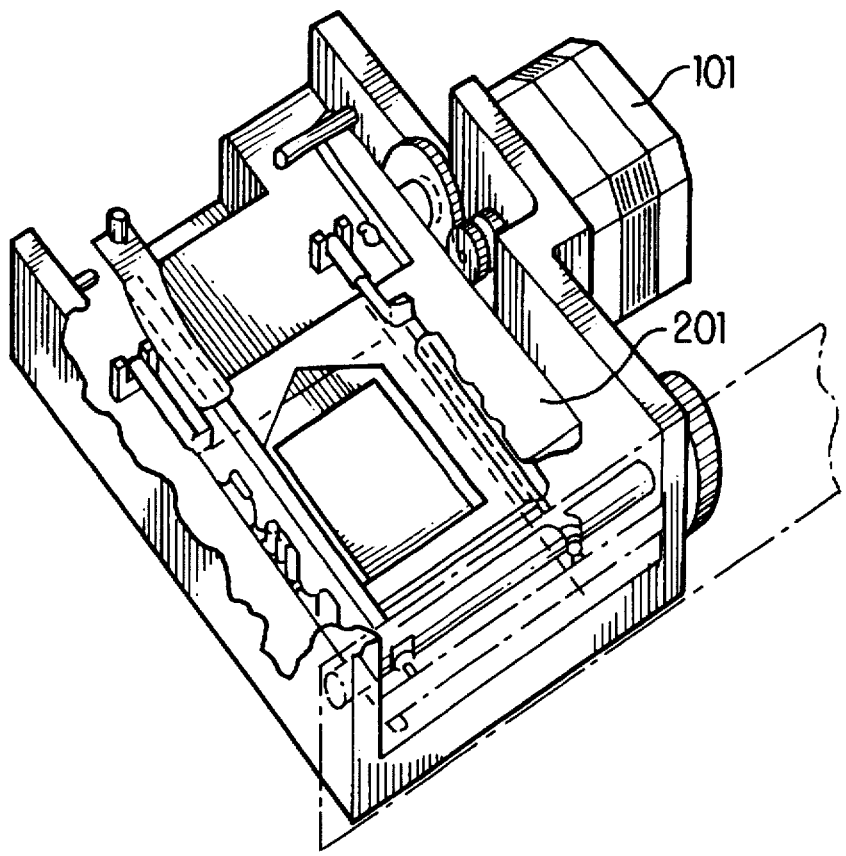
FIG. 11 depicts another conventional film image input system.

An optical detection assembly 47, a magnetic detection assembly 48, and a sensor board 49, similar to the optical mark reading assembly 713, optical sensor 714, and magnetic head 715 of the embodiment of Japanese Laid-Open Patent Application No. 5-75922, shown in FIG. 10, are located in original holder 40. The detection signals of these components are transmitted through connectors 10b and 40c.

The optical detection assembly 47 includes a light emitting component and a light receiving component. The optical detection assembly 47 detects the amount of light reflected from the original document 51 and determines from the level of the detected light whether an original document is present in the original holder 40. Additionally, the optical detection assembly 47 determines the classification of the original document (i.e., either positive film or negative film) through the difference in concentration of the base material of the film material. The optical detection assembly 47 may also be set to detect output variations according to notches, holes, or perforations in the original document that show the frame position of the original document. A controlling circuit 20 in the main body 20 receives the output of the optical detection assembly 47 and can calculate the film feeding and frame number.

The optical detection assembly 47 may also read raster codes from bar codes imprinted in areas outside the film field or from holes or perforations. Information that may be obtained from the optical detection assembly 47 include film characteristic data necessary for printing from negative film, characteristic information codes such as film classification, developing procedures, and the like, and standard patterns for fading correction.

The magnetic detection assembly 48 detects magnetic information recorded on original documents that have a magnetic recording layer. The magnetically recorded information includes sound information, the frame number information corresponding to each photographic field, the F number and shutter speed of the photo lens, the presence or absence of strobe light emission, exposure correction information at the time of photography, date and time of photography, color temperature of the illumination at the time of photography, zooming information, and orientation of the camera at the time of photography (vertical, horizontal, inverted). The detected information output by the magnetic detection assembly 48 is transmitted to the controlling circuit 20 through connectors 10b and 40c, in a similar manner as the output from the optical detection assembly 47. This data is used as the controlling data of the controlling circuit 20 during image reading. This data is also transmitted from the controlling circuit 20 as data relating to the reading field to a host computer connected to the main body 1 of the image input device and can be used as filing data or the like accompanying the image information.

The rotation of the rotary spool driving mechanism 43 or the spool rotation coupler shaft 42 is detected by a motor pulse, rotation encoder, or the like (not shown). The rotation direction and rotation amount of the film feeding are transmitted to the main body 1 through connectors 10b and 40c as operating signals. The controlling circuit 20 controls rotation action of the spool rotary driving mechanism 43 for winding and rewinding the original document in the film cartridge 50 in the original holder 40.

Figure 8:
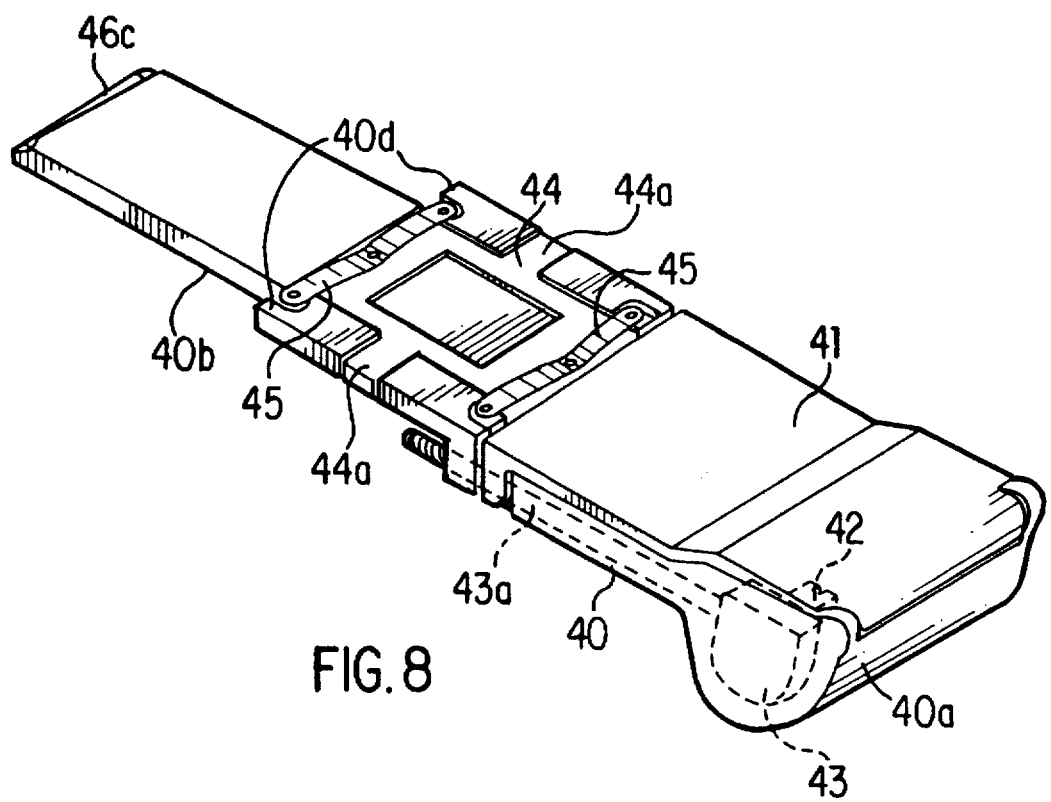
FIG. 8 is a schematic view of another cartridge holder for the image input system of the present invention.
Figure 9:
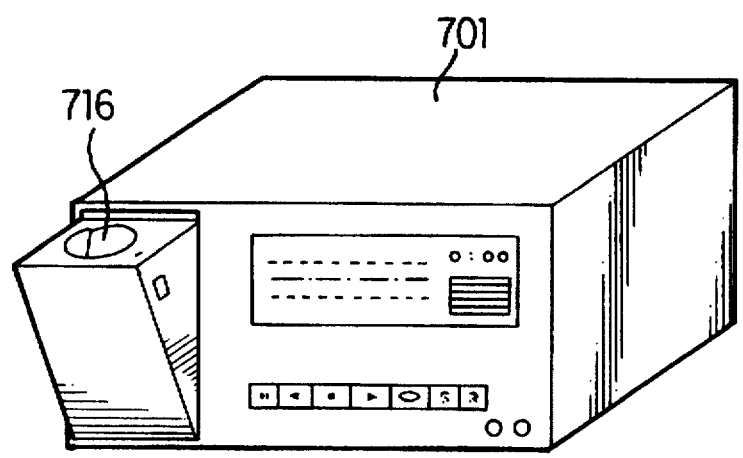
FIG. 9 depicts a conventional film image input system.

In FIG. 4, the entire rotary spool driving mechanism 43, which includes a film feeding motor (not shown), is positioned inside the original holder 40. Alternatively, it is also possible to position part of the motor and rotary spool driving mechanism inside the main body 1 and use a mechanical connection 43a, such as, for example, a gear system or rotating shaft or the like, between the original holder 40 and the driving mechanism, as shown in FIG. 8. similarly, the transmission of the electrical supply and operating signals through the connectors 10b and 40c from the optical detection assembly 47 and the magnetic detection assembly 48 controls the rotation action of the original document feeding and rewinding.

An aperture 40e, as shown in FIG. 5, is located in the film holding component 40b of the original holder 40. The aperture 40e permits light rays to pass between the top mirror 4 and the bottom prism 5 when the carriage assembly 10 is loaded and conveyed to the image reading position. A pressing frame 44 maintains the original document in a flattened condition and is supported at the top of the aperture 40e by compression springs 45 so as to be able to move toward the original holder 40 (FIG. 4). The compression springs 45 act to press the pressing frame 44 against the original holder 40. The original document 51 positioned between the frame 44 and holder 40 is straightened and maintained in a flat position.

A push-up pin 17 is supported on the carriage assembly 10 in a position opposite a push-up component 44a on the pressing frame 44. This arrangement permits vertical movement of the original document 51 in the vicinity of the aperture 40e. When carriage assembly 10 is conveyed to the film feeding action position (described hereafter), the push-up pin 17 resists the force of the compression spring 45 to lift up the pressing frame 44 and forms a space between the original holder 40 and the pressing frame 44. The original document 51 can pass through this space. Alternatively, a portion of the original holder 40 may be formed from a light permeable or transparent material. This material allows light rays necessary for image reading to pass and permits elimination of the aperture 40e.

The guide rollers 46a, 46b and 46c, as shown in FIG. 5, correct original document curling during feeding and provide for a smooth feeding action. The guide rollers 46a, 46b and 46c are rotatably supported on the original holder 40.

As shown in FIG. 1, a film winding spool 30 is located in the main body 1 at an end opposite the aperture 19a. A rotation shaft 30a of the film winding spool 30 is rotatably supported on the main body 1.

The rotary force of a film winding motor (not shown) is transmitted to the winding rotation shaft 30a via a gear system (not shown). The film winding motor is housed within the main body 1 and rotates in the film advancing direction or the film rewinding direction according to a controlling signal from the controlling circuit 20. The film winding spool 30 winds the original document sent from the original holder 40 for an image reading action (described hereafter). The controlling circuit 20 controls the rotation of the film winding spool 30 in either the winding or rewinding directions based upon the rotation conditions of the spool 52 (FIG. 5) and the conveyance movement of the carriage assembly 10.

A film guide bar 31 regulates the movement direction of the original document 51 at the film winding spool 30. A hang-down prevention component 31a of the guide bar is positioned between the film winding spool 30 and the carriage 10. The hang-down prevention component 31a is virtually level with both the spool 30 and carriage 10. This arrangement prevents the leading edge of the original document 51, which has been fed out from the film cartridge 50, from hanging down under its own weight prior to reaching a position touching the film winding spool 30. This hang-down prevention component 31a is effective in promoting a smooth film winding and rewinding action. Guide arms 32 and 33 are utilized as guide components during the winding of the original document 51 to the film winding spool 30. The guide arms 32 and 33 are rotatably supported by support axes 32a and 33a, respectively. Rollers 32b and 33b are located on the front ends of the guide arms 32 and 33, respectively. Forces are applied to the guide arms 32 and 33 in a counter-clockwise direction about the support axes 32a and 33a by springs (not shown). These forces produce rotary forces in directions that cause the rollers 32b and 33b to contact the film winding spool 30. The guide arms 32 and 33 and the film winding spool assembly 30 are of a commonly known structure similar to a motor-driven film winding mechanism used on a camera that uses common 35 mm film.

Alternatively, the winding up mechanism portion of the winding spool 30 and of the guide arms 32 and 33 may be simply structured as an empty space. The empty space need only be sufficient to house the original document that has been fed from the original holder 40. A film guide, however, is preferable that does not allow the original document to be scratched or soiled.

The image reading operations will now be described in which images from slide film mounted into film mounts, film strips set in the cartridge holder 401, and developed cartridge film that has been set in the cartridge holder 40 are each converted and output as image signals.

The image reading operation using a slide film mount 200 will now be described. The slide film mount 200 is inserted into the main body 1 through aperture 19a to the position shown in FIG. 3(a). An image reading commencement signal is transmitted from the host computer to the main body 1 through a fixed interface. Alternatively, an image reading commencement command is sent to the controlling circuit 20 through the operation of an image reading commencement button (not shown) located on an outer surface of the main body 1 or front panel 19. In response, the controlling circuit 20 activates the stepping motor 14 and rotates the motor shaft 14a and gear 13 (shown FIGS. 1 and 2) in a clockwise direction. As the stepping motor 12 rotates in the clockwise direction, the pinion gear 12a rotates in the counter-clockwise direction. This rotation causes rack 10a to move as the pinion gear 12a rotates, causing the carriage assembly 10 to slide along the guide shafts 11a and 11b from the film insertion/extraction position shown in FIG. 1, toward the left side of the main body 1 in FIG. 1. When the carriage assembly 10 moves from a position adjacent the front panel 19 to the interior of the main body 1 (i.e., the left side of FIG. 1), the carriage assembly 10 moves to a position in which it is aligned with the image reading commencement point (P1 in FIG. 3(a)) of the image irradiating/reading light path between the top mirror 4 and the bottom prism 5.

The reading commencement position of the carriage assembly 10 is confirmed when the controlling circuit 20 is notified that the driving pulse number of the stepping motor 14 has reached a fixed number after the action commences. The position may also be confirmed when the controlling circuit 20 receives an output from a photo sensor that detects when the carriage assembly 10 has reached a fixed position. Additionally, the position may be confirmed when a detected output such as an output variation of the line sensor 7 (for example, light rays are mostly interrupted by the carriage 10 from reaching the line sensor 7 until the carriage assembly 10 moves to position P1; at P1, the light passing the film shines on the line sensor 7) is transmitted to the controlling circuit 20.

When the controlling circuit 20 confirms that the carriage assembly 10 has moved to the reading commencement position, irradiated light from the LED unit 2 passes through the optical system and permeates the original document. One line of the photoelectric output is composed into an image on the line sensor 7 and is output by the line sensor 7. The controlling circuit 20 then sends a pulse number to the stepping motor 14 to move the carriage assembly 10 a distance that corresponds to one line of the image reading portion. This line-by-line reading action and feeding action is repeated for the number of scanning lines in a single field until the carriage assembly reaches the image reading completion point P2, shown in FIG. 3(a), thus completing the image signal conversion and output for a single field.

It is also possible to move the carriage assembly 10 so that a pre-scan action, which is rougher and faster than the image input scanning, is accomplished over the range from position P1 to position P2. This pre-scan action may be performed before the conversion and output actions of the image information between P1 and P2 to set enhanced image conversion conditions for the film photographic image condition or the like. After the prescan action, the carriage assembly 10 is returned to the image reading commencement point P1, and the image reading is performed.

The carriage assembly 10 may pass the image reading completion point P2 and move further into the interior of the main body 1. When a film eject signal is transmitted from the host computer after completion of the image input or when a film eject command is sent to the controlling circuit 20 through the operation of an eject button (not shown), a pulse signal is transmitted from the controlling circuit 20 to the stepping motor 14. The carriage assembly 10 is then moved past position P2 to an innermost position. During this over-scanning action, the carriage assembly 10 moves to the end of its range of travel. The eject component 16 causes the slide film mount 200 to move on the carriage assembly 10 a fixed amount in the direction of the front panel 19. The controlling circuit 20 then transmits a counter-clockwise rotation pulse signal to the stepping motor 14. The carriage assembly 10 moves from the over-extended position to the film insertion/extraction position, shown in FIG. 1. This completes one cycle of the image input action.

The image reading operation using a strip film holder 401 will now be described. The strip film holder 401 is inserted into the main body 1 through aperture 19a to the position shown in FIG. 3(b). The reading action and the eject action are performed from the set condition shown in FIG. 3(b) in the same manner as discussed above in connection with the slide film mount 200. The main difference is that, since the strip film holder 401 is longer than the slide film mount 200, the strip film holder 401 undergoes the scanning movement with the carriage assembly 10 while protruding to the left and right past the range on the carriage assembly 10 over which the compression springs 15 act, as shown in FIG. 3(b).

When image reading is performed on a single frame film or dental X-ray film, the image reading can be performed by installing the original document into an adaptor (film holder) of the same size as the slide film mount or strip film holder and proceeding with the image reading action in the same manner as described above in connection with the slide mount film 200 or the strip film holder 401.

Figure 7:
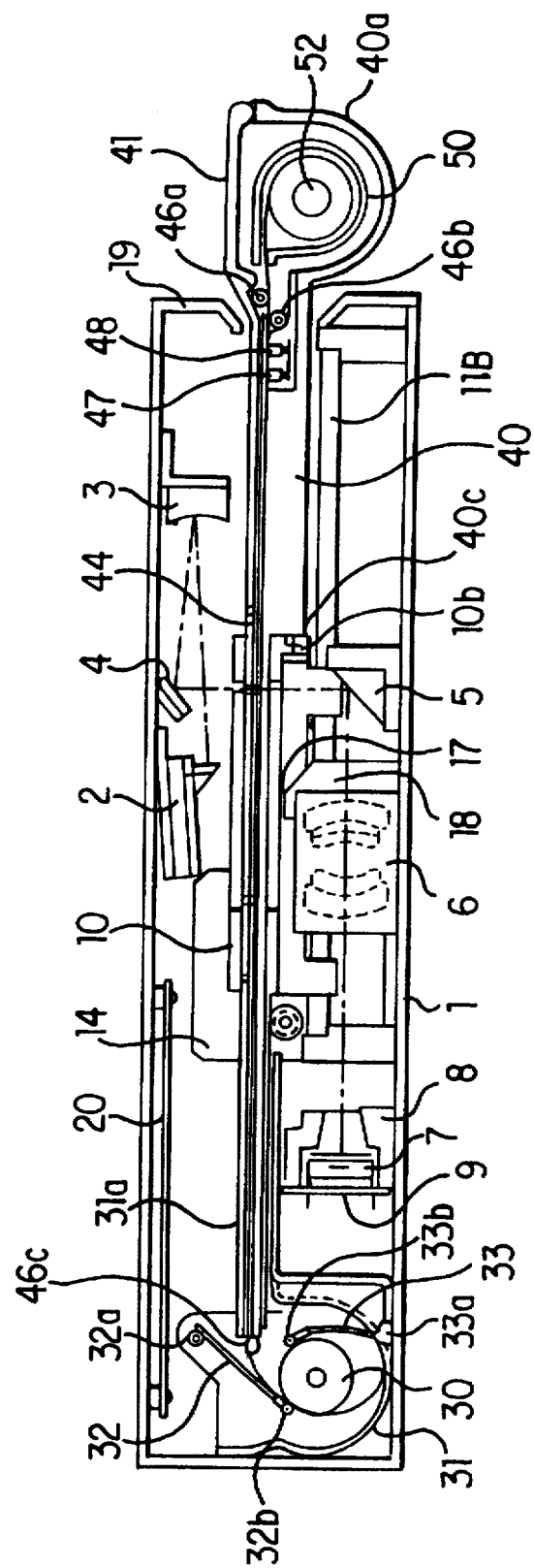
FIG. 7 is a cross sectional view depicting the cartridge holder of FIG. 4 connected to image input system of FIG. 1 in an image reading set position.

The image reading operation using the original holder 40 will now be described. The original holder 40 is inserted into the main body 1 through aperture 19a to the position shown in FIG. 6. A reading action commencement command is then sent to the controlling circuit 20, and the stepping motor 14 rotates in the clockwise direction. When the connectors 10b and 40c are connected, the controlling circuit 20 determines that the original holder 40 is being used and sets a controlling mode for the original holder. The carriage assembly 10 moves left with the clockwise rotation of the stepping motor 14 from the set position shown in FIG. 6 to the position shown in FIG. 7. The position shown in FIG. 7 is slightly past the film reading completion position P2. Before the carriage assembly 10 reaches position P2, the bottom of the push-up pin 17 contacts the slanted surface of the push-up block 18 and is gradually pushed upwards. When the carriage assembly 10 moves to the image reading position, shown in FIG. 7, the push-up pin 17 resists the force of the compression spring 45 and pushes up the pressing frame 44. This action preserves a gap for the original document 51 to pass between the cartridge holder 40 and the pressing frame 44. The gap is maintained by the push-up block 18.

When the carriage assembly 10 is moved to the image reading position, the controlling circuit 20 temporarily stops the carriage moving action of the stepping motor 14, causing electrical power to be supplied to the original holder 40 through the connectors 10b and 40c. The electrical power in turn causes the motor of the rotary spool driving mechanism 43 to rotate. The original document 51 then rolls out from the cartridge 50. Spool 52 rotates until the film field of the desired frame number is positioned over the aperture 40e for image reading. The detection of the feeding condition of the original document 51 and of the number of frames to be fed is accomplished by the optical detection assembly 47 and the magnetic detection assembly 48. The detection signal is transmitted to the controlling circuit 20 through connectors 10b and 40c. When the controlling circuit 20 determines that the film field of the desired frame number has been fed to the aperture 40e, the feeding action of the rotary spool driving mechanism 43 stops, and spool 52 stops rotating. The stepping motor 14 is then rotated in the counter-clockwise direction, the carriage assembly 10 moves to the right in the reverse direction, and the carriage assembly is conveyed to the same position as the image reading commencement point P1 for the slide mount film 200 or the strip film holder 401, as shown in FIG. 3(a) and 3(b). Through the actions up to this point, the cartridge film image to be read is set. The image reading is then performed.

The image reading is performed in a similar manner as discussed above in connection with image reading from the slide mount film 200 and the strip film mount 401. The carriage assembly 10 is moved so that light rays from the illuminating optical system permeate the field positions corresponding to the space between the film reading commencement point P1 and the film reading completion point P2 and are output to the line sensor 7 as composed images, one line at a time.

A photoelectric conversion output is performed for a fixed number of scanning lines. When the scanning feeding movement of the carriage assembly 10 and the image reading are completed up to the set field reading completion point P2, the controlling circuit 20 controls the rotation of the stepping motor 14 in such a way that the carriage assembly 10 moves once again to the cartridge film reading field set position, shown in FIG. 7. When a command signal for the next frame number from which an image is to be read has been input or is newly input, the original document is fed to the next desired frame number. The field setting action is performed. The image reading action is performed for the field of the new frame number. When no instructions for the next input field are input, a film extraction command is sent to the controlling circuit 20. A controlling signal is transmitted from the controlling circuit 20 when the carriage assembly 10 is at the reading field set position. The controlling signal causes the motor of the rotary spool driving mechanism 43 to rotate. Spool 52 rotates in a direction (i.e., the clockwise direction) that winds the original document into the cartridge 50.

When the detection signal indicating that all of the original document 51 has been rewound into the cartridge 50 is transmitted from the original holder 40 to the controlling circuit 20, the controlling circuit 20 causes the stepping motor 14 to rotate and carries out the eject action. The carriage assembly 10 is first moved to the over-scanning position at the farthest point from the front panel 19, in the same manner as the extracting actions of the slide mount 200 and strip film holder 401. This causes the original holder 40 on the carriage assembly 10 to move a fixed amount from its pushed in position. The carriage assembly 10 then moves to the film loading/extraction position, shown in FIG. 6.

When a reading action commencement command is received when the original holder 40 is at the loaded condition, shown in FIG. 6, and a cycle of the image reading action begins, the original holder 40 held on the carriage assembly 10 is moved to the left and then returns to the position shown in FIG. 6. The carriage assembly returns after the film eject command has been given and the original document 51 has been rewound into the cartridge 50. Therefore, during the image reading action, since the original holder 40 is held in a position in the main body 1 at which it has moved past the position shown in FIG. 6, the front end of the housing component cover 41 is inserted through the aperture 19a. The front panel 19 restricts the opening action of the housing component cover 41, preventing the operator from mistakenly opening the housing component cover 41 and removing the film cartridge 50 while the image reading action is performed.

To protect the original document, an additional step may be taken to prevent the removal of the original holder 40 from the main body 1 during the image reading action. A mechanism may be included that mechanically locks the original holder 40 to the carriage assembly 10 when the feeding of the original document 51 from the film cartridge 50 is detected. This locking may occur when an operating signal relating to the film feeding rotation direction and rotation amount of the rotary spool driving mechanism 43, or the detection signal of an optical detection assembly 47 or a magnetic detection assembly 48 is received by the controlling circuit. Alternatively, the position of the carriage assembly 10 can be determined by calculation of the rotation controlling pulse of the stepping motor 14 or through the output of an optical sensor that detects that the carriage assembly 10 is in the cartridge holder loading set position, shown in FIG. 6. When a detection output showing that the carriage assembly 10 is in the cartridge holder loading set position is not transmitted, the controlling circuit 20 operates to lock the original holder 40.

An original document contained in the original holder 40 that the original document is set in the carriage assembly and read and moved line by line in the same way as with image input from the slide film mount 200 and strip film holder 401. The rotary spool driving mechanism 43 inside the original holder 40 rotates in the reading field set position in order to feed and rewind the original document and does not rotate to move the carriage assembly 10 during the image reading action. Conversely, the film winding motor that drives the rotation of the film winding spool is regulated so as to operate only when it is confirmed through the connection of connectors 10b and 40c that the original holder 40 has been loaded.

The film winding motor rotates during each of the following operating conditions. During film feeding rotation of spool 52, the film winding motor 34 rotates in a direction that winds the original document such that the rotation speed of the film winding spool 30 is equal to or greater than the feeding speed of the original document from the spool 52. This winding speed minimizes slack in the moving original document during winding. During the rewinding rotation of the spool 52, the film winding motor rotates in a direction that returns the original document to the film cartridge 50. The rotation speed of the film winding spool 30 is less than or equal to the moving speed of the original document that is being rewound onto the spool 52. This rotational speed minimizes slack in the moving original document during rewinding. During the movement of the carriage assembly 10 away from the aperture 19a, the film winding motor rotates in a direction that winds the original document such that the rotation speed of the film winding spool 30 is less than or equal to the moving speed of the carriage assembly 10. The winding is such that slack is developed between the original holder 40 and the film winding spool 30, avoiding applying unnecessary tension on the original document 51 that is held between the original holder 40 and the pressing frame 44. The film feeding movement is performed such that scratches from shifting of the original document during the image reading action and from the pressing frame are prevented.

During the movement of the carriage assembly 10 toward the aperture 19a, the film winding motor rotates in the direction that rewinds the original document such that the rotation speed of the film winding spool 30 is greater than or equal to the moving speed of the carriage assembly 10. The winding develops slack between the original holder 40 and the film winding spool 30, avoiding applying unnecessary tension onto the original document 51 that is held between the cartridge holder 40 and the pressing frame 44. The film feeding movement is performed such that scratching of the original document from the pressing frame 44 is prevented.

A friction slide mechanism (not shown) is attached to the rotation shaft of the film winding spool 30 to prevent the occurrence of a rotary force that exceeds a fixed torque. The slide mechanism prevents a force above a set limit from breaking the original document 51 during the feeding actions.

During the reading of the original document, when the conveying and reading of the original document are performed during the movement of the carriage assembly, a precise feeding movement can easily be achieved. However, the carriage moving action takes up time for each film winding action that is accomplished for field selection, and when multiple fields are read in succession from a single roll of film, the time interval for the standard actions other than the actual reading action becomes relatively lengthy. A device may be constructed on which the operator may select whether the reading action from the cartridge film will operate according to the carriage moving method or the film winding method. Alternatively, the film winding action may be automatically selected when a cartridge film is set in the device.

With this arrangement, the image reading action from original documents, such as slide mount film or strip film, that do not use the original holder 40 is accomplished in the same manner as described above. When the original holder 40 containing cartridge film 50 is loaded on the device, the operation is as follows. When the reading action commencement command is sent to the controlling circuit 20 when the carriage assembly 10 is at the set condition, shown in FIG. 6, the stepping motor 14 operates, and the carriage assembly 10 is moved to the position shown in FIG. 7. At this point, the controlling circuit 20 is set to the original holder controlling mode through the signal transmission response from the connection of connectors 10b and 40c. In the position shown in FIG. 7, the carriage assembly 10 stops due to the stopping of the stepping motor 14. The motor of the spool rotating mechanism 43 and the film winding motor 34 are then activated and caused to rotated. The feeding of the original document up to the film field of the frame number from which the image is to be read is accomplished in the same manner as described above.

When the cartridge film reading method selecting assembly is set to the original moving method, the subsequent operations are the same as described above. When the film winding movement method is set for consecutive high-speed reading (or when the structure is such that the film winding method is automatically set), the controlling circuit 20 does not move the carriage assembly 10 for film reading scanning, but activates the motor of the spool rotating mechanism 43 and the film winding motor 34 and moves the original document for reading scanning by the line sensor 7. The film feeding movement at this point is accomplished one scanning line at a time in the same manner as the movement of the carriage assembly 10. It is also acceptable to provide an encoder that operates in conjunction with the roller 46a positioned inside the original holder 40 and to cause the output of the encoder to be transmitted to the controlling circuit 20 in order to accurately control the moving speed of the original document 51. Alternatively, the movement amount of the original document 51 can be detected using the output of an optical detection assembly 47 or a magnetic detection assembly 48.

When the next reading field frame number command is sent to the controlling circuit 20 as the film feeding action for the line scanning of one film field is completed, the film feeding actions of the motor of the spool rotating mechanism 43 and the film winding motor 34 are accomplished for the purpose of field selection and setting, and the reading of the next indicated field is accomplished in the same manner as that of the first indicated field. The reading action is accomplished sequentially for each field for the indicated number of frames, and when there is not an indication for a next input field and the eject command is sent to the controlling circuit 20, the motor of the spool rotary driving mechanism 43 rotates, and the spool 52 rotates in the clockwise direction of the drawing and rewinds the original document into the cartridge 50. A controlling signal is transmitted from the controlling circuit 20 through the connectors for this purpose. When a detection signal showing that all of the original document has been rewound into the cartridge 50 is transmitted to the controlling circuit 20, after the controlling circuit 20 has moved the carriage assembly 10 to the over-scanning position at the farthest possible point from the front panel, the controlling circuit 20 causes the stepping motor 14 to rotate so as to move the carriage assembly 10 to the film loading/ejecting position, as shown in FIG. 6, and carries out the eject action in the same manner as the ejection action, described above.

After the carriage assembly 10 receives the reading action commencement command and moves to the position shown in FIG. 7, the carriage assembly 10 does not move at all during the actions that occur up until the time that the carriage assembly receives the eject command and commences the eject action. In addition, the flatness of the original document film during the image reading from the original document is maintained by regulating the rotation speed of the wind spool 30 to be slightly faster than the speed at which the film is fed from the spool 52, thereby generating a mild tension in the original document 51.

As described above, according to the image input system of the present invention, an image input system can be provided that reads images from different configurations and types of original documents. In addition, both the input device and the original holder used with the device can be provided with a compact, inexpensive structure, wherein the film loading operation can be easily managed and an accurate image information reading can be easily accomplished.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined by the following claims.

What is claimed is:

1. An image input system for reading images from an original document, comprising:
    an image input device having a light emitting assembly that emits reading light onto the original document positioned within said image input device, a reading assembly that reads and composes light passing the original document into an image signal, and an assembly that moves said reading assembly and the original document relative to each other such that the reading light scans over the original document; and
    an original holder that feeds the original document into said image input device, said original holder being connected to said image input device and having a document housing component for housing an original document cartridge containing a spindle having the original document wound thereon, a coupling shaft connectable to the spindle, and a rotation assembly that transmits a rotary driving force to the spindle for moving the original document within said original holder, wherein said original holder is removably attached to said image input device.

2. The image input system according to claim 1, wherein said rotation assembly includes an electric motor that produces the rotary driving force, and wherein the rotary driving force is transmitted to said coupling shaft.

3. The image input system according to claim 1, wherein said rotation assembly includes a manual drive assembly that produces the rotary driving force, wherein the rotary driving force is transmitted to said coupling shaft.

4. The image input system according to claim 1, wherein said image input device includes a document receiving component that stores the original document fed from said original holder during rotation of the spindle.

5. The image input system according to claim 4, wherein said document receiving component includes a document receiving spindle and a guide arm for storing the original document in a rolled condition in said document receiving component.

6. The image input system according to claim 5, wherein said document receiving component winds said original document to eliminate slacking of the original document that occurs through the movement of said assembly that moves said reading assembly and the original document relative to each other or through the rotation of the coupling shaft.

7. The image input system according to claim 5, wherein said document receiving component includes a rotary driving device that rotates said document receiving spindle.

8. The image input system according to claim 1, wherein said original holder includes a connector assembly that electrically connects said original holder to said image input device.

9. The image input system according to claim 8, wherein said assembly that moves said reading assembly and the original document relative to each other is a movable carriage assembly and wherein said connector assembly connects said original holder to said carriage assembly, said original holder moving as said carriage assembly moves.

10. The image input system according to claim 9, wherein said original holder includes a rotation detector that detects rotation of said coupling shaft, and wherein an output signal of said rotation detector is transmitted from said original holder to said image input device through said connector assembly.

11. The image input system according to claim 9, wherein a control signal for said rotation assembly is transmitted from said image input device to said original holder through said connector assembly.

12. The image input system according to claim 11, wherein electric power for said rotation assembly is supplied from said image input device to said original holder through said connector assembly.

13. The image input system according to claim 8, wherein said original holder includes a detecting component that detects information recorded on the original document and transmits the information to said image input device.

14. The image input system according to claim 13, wherein said detecting component includes an optical detector that detects the original document and information affixed to the original document.

15. The image input system according to claim 13, wherein said detecting component holder includes a magnetic detector that detects the original document and information magnetically recorded on the original document.

16. The image input system according to claim 1, wherein said original holder includes a flat portion having an aperture, whereby the original document passes over said flat portion and said aperture such that the reading light passes through the original document and said aperture to said reading assembly.

17. The image input system according to claim 16, wherein said aperture is formed from a transparent material.

18. The image input system according to claim 16, further comprising a hold-down component positioned around a perimeter of said aperture in said flat portion to hold down the original document.

19. The image input system according to claim 16, wherein said original holder includes a document pressing assembly that presses the original document against said aperture.

20. The image input system according to claim 19, wherein said original holder has a switching assembly that switches said document pressing assembly between a pressing condition, in which the original document is pressed against said aperture, and a released condition, in which the original document is not pressed against said aperture.

21. The image input system according to claim 20, wherein said assembly that moves said reading assembly and the original document relative to each other is a movable carriage assembly and wherein said switching assembly switches to said pressing condition when said carriage assembly moves and switches to said released condition when said coupling shaft is rotated.

22. The image input system according to claim 21, wherein said carriage assembly includes a contact component that contacts said switching assembly at a fixed position on a travel path of said carriage assembly, wherein said switching assembly and said contact component contact each other when said carriage assembly moves said original holder to a fixed position and switches the original document pressing component to said released condition.

23. The image input system according to claim 1, wherein said housing component includes a cover for inserting and removing the original document cartridge.

24. An image input device, comprising:
- a light emitting assembly that emits reading light onto an original document positioned within said image input device;
- a reading assembly that reads and composes light passing the original document into an image signal;
- an assembly that moves said reading assembly and the original document relative to each other such that the reading light scans over the original document;
- a document receiving component that stores that original document after image reading, wherein said document receiving component includes a document receiving spindle and guide arm for storing the original document in a rolled condition in said document receiving component; and
- an original holder that feeds the original document into said image input device, said original holder being connected to said image input device and having a document housing component for housing an original document cartridge containing a spindle having the original document wound thereon, a coupling shaft connectable to the spindle, and a rotation assembly that transmits a rotary driving force to the spindle for moving the original document within said original holder, wherein said original holder is removably attached to said image input device.

25. The image input device according to claim 24, wherein said document receiving component winds said original document to eliminate slacking of said original document that occurs through the movement of said assembly that moves said reading assembly and the original document relative to each other or through the rotation of the coupling shaft.

26. An original holder for feeding an original document into an image input device in an image input system, comprising:
- a cartridge housing component for housing an original document cartridge containing a spindle having the original document wound thereon;
- a coupling shaft connectable to the spindle;
- a rotation assembly that transmits a rotary driving force to the cartridge spindle for moving the original document within said original holder; and
- a document pressing assembly that presses the original document against an aperture, wherein the original holder has a switching assembly that switches said document pressing assembly between a pressing condition in which the original document is pressed against said aperture and a released condition in which the original document is not pressed against said aperture.

27. The original holder according to claim 26, wherein said original holder includes a connector assembly that electrically connects said original holder to the image input device.

28. The original holder according to claim 26, wherein said original holder includes a detecting component that detects information recorded on the original document and transmits the information to the image input device.

29. The original holder according to claim 26, wherein said original holder includes a flat portion having an aperture, whereby the original document passes over said flat portion and said aperture such that a reading light from the image device passes through the original document and said aperture.

30. The original holder according to claim 26, further comprising a hold-down component around a perimeter of said aperture in said flat portion to hold down the original document.

31. The original holder according to claim 26, wherein said cartridge housing component includes a cover for inserting and removing the original document cartridge.

32. An image input system for reading images from an original document, comprising:
- an image input device having light emitting means for emitting a reading light onto the original document positioned within said image input device, light reading means for reading and composing light passing through the original document into an image signal, and original document moving means for moving said light reading means and the original document relative to each other such that the reading light scans over the original document; and
- an original holder that feeds the original document into said image input device, said original holder being connected to said image input device and having housing means for housing an original document cartridge, coupling means for coupling the original document cartridge to said original holder, and rotation means for producing a rotary driving force for moving the original document within said original holder, wherein said original holder is removably attached to said image input device.

33. The image input system according to claim 32, wherein said image input device includes storage means for storing the original document fed from said original holder after image reading.

34. The image input system according to claim 32, further comprising connection means for electrically connecting said original holder to said image input device.

35. The image input system according to claim 34, wherein said original holder includes detection means for detecting the rotation of said coupling shaft, and wherein an output signal of said detection means is transmitted from said original holder to said image input device through said connection means.

36. The image input system according to claim 32, wherein said original holder includes information detection means for detecting information recorded on the original document and transmitting the information to said image input device.

37. The image input system according to claim 32, wherein said original holder includes a flat portion having an aperture whereby the original document passes over said flat portion and said aperture such that the reading light passes through the original document and said aperture to said reading means.

38. The image input system according to claim 37, wherein said original holder includes holding means for holding the original document against said aperture.

39. An original holder for feeding an original document into an image input device in an image input system, comprising:
- housing means for housing an original document cartridge;
- coupling means for coupling the original document cartridge to said original holder;
- rotation means for producing a rotary driving force for moving the original document within said original holder; and
- wherein said original holder includes a rotation detector that detects rotation of said coupling means, and wherein an output signal of said rotation detector is transmitted from said original holder to said image input device through a connector assembly.

40. The original holder according to claim 39, further comprising connection means for connecting said original holder to the image input device.

41. The original holder according to claim 39, further comprising information detection means for detecting information recorded on the original document and transmitting the information to the image input device.

42. The original holder according to claim 39, wherein said original holder includes a flat portion having an aperture whereby the original document passes over said flat portion and said aperture such that a reading light from the image device passes through the original document and said aperture to said reading assembly.

43. The original holder according to claim 42, further comprising pressing means for pressing the original document against said flat portion and said aperture.

44. A method of reading images from an original document using an image input system including an image input device having a light emitting assembly that emits reading light onto the original document, a reading assembly that reads and composes light passing the original document into an image signal and a carriage assembly that moves said reading assembly and the original document relative to each other, and an original holder that feeds the original document into said image input device, said original holder having a document housing component for housing an original document cartridge, a coupling shaft adapted to be connected to the original document cartridge, and a rotation assembly that transmits a rotary driving force to the original document cartridge for moving the original document within said original holder, said method comprising the steps of:

feeding the original document from said original holder onto said carriage assembly within said image input device;

securing the original document in an image reading position on said carriage assembly;

emitting a beam of light from said light emitting assembly onto the original document; and reading an image into the image signal with said reading assembly from the original document.

45. The method according to claim 44, further comprising the step of connecting said original holder to said carriage assembly of said image input device.

46. The method according to claim 44, wherein the step of feeding the original document includes rotating said rotation assembly to feed the original document.

47. The method according to claim 44, further comprising the step of storing the original document in a document receiving component in said image input device after image reading.

48. The method according to claim 47, wherein said step of storing the original document in said document receiving component includes winding the original document around a document receiving spindle for storing the original document in a rolled condition in said document receiving component.

49. The method according to claim 44, further comprising the step of eliminating slack in the original document that occurs through the movement of the carriage assembly or through the rotation of the coupling shaft.

50. The method according to claim 44, further comprising the steps of:

detecting the rotation of said coupling shaft; and transmitting an output signal of coupling shaft rotation from said original holder to said image input device.

51. The method according to claim 44, further comprising the steps of:

detecting information recorded on the original document; and transmitting the information to said image input device.

52. The method according to claim 44, further comprising the step of selectively pressing the original document against an aperture in a flat portion of said original holder.

53. The method according to claim 52, wherein the original document is pressed against said aperture when said carriage assembly moves and releasing said original document when said coupling shaft of said original holder is rotated.

* * * * *